United States Patent
Golitschek Edler Von Elbwart et al.

(10) Patent No.: US 7,920,636 B2
(45) Date of Patent: Apr. 5, 2011

(54) SIGNAL SPACE EXPANSION FOR A 16 QAM SCHEME

(75) Inventors: Alexander Golitschek Edler Von Elbwart, Darmstadt (DE); Isamu Yoshii, Frankfurt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 11/913,275

(22) PCT Filed: May 4, 2005

(86) PCT No.: PCT/EP2005/004892
§ 371 (c)(1),
(2), (4) Date: Oct. 31, 2007

(87) PCT Pub. No.: WO2006/117015
PCT Pub. Date: Nov. 9, 2006

(65) Prior Publication Data
US 2008/0192851 A1    Aug. 14, 2008

(51) Int. Cl.
*H04L 23/02* (2006.01)
*H04L 5/12* (2006.01)
(52) U.S. Cl. ......... 375/261; 375/295; 375/298; 455/108
(58) Field of Classification Search .................. 375/261, 375/295, 298; 455/108
See application file for complete search history.

(56) References Cited

U.S. PATENT DOCUMENTS

| 6,195,396 | B1 | 2/2001 | Fang et al. |
| 6,404,755 | B1 * | 6/2002 | Schafer .................. 370/338 |
| 6,459,703 | B1 * | 10/2002 | Grimwood et al. ........... 370/442 |
| 2002/0163975 | A1 | 11/2002 | Uesugi et al. |
| 2002/0199147 | A1 | 12/2002 | Kim et al. |

FOREIGN PATENT DOCUMENTS

EP     1235404      8/2002

OTHER PUBLICATIONS

U. Hansson, et al. "Channel Symbol Expansion Diversity-Improved Coded Modulation for the Rayleigh Fading Channel," IEEE International Conference on Communications, Jun. 23-27, 1996, pp. 891-895.

* cited by examiner

Primary Examiner — Ted M Wang
(74) Attorney, Agent, or Firm — Dickinson Wright PLLC

(57) ABSTRACT

The invention relates to methods for transmitting and receiving a data bit stream in a communication system using a 16-QAM constellation. Further, an apparatus for performing the methods is provided. To provide a modulation and coding scheme using a signal space expansion and 16-QAM which improves the bit-error rate in comparison to QPSK modulated signals and still provides the possibility to implement coders and decoders with low complexity the invention suggests the use a 16-QAM constellation with specially selected mapping rules together with repetition coding (signal space expansion) and interleaving of the data stream to be transmitted.

15 Claims, 11 Drawing Sheets

SIGNAL SPACE EXPANSION FOR A 16 QAM SCHEME

FIELD OF THE INVENTION

The invention relates to methods for transmitting and receiving a data bit stream in a communication system using a 16-QAM constellation. Further, an apparatus for performing the methods is provided.

TECHNICAL BACKGROUND

Signal Space Expansion

An uncorrelated Rayleigh channel can be regarded as a worst case channel for digital radio communication. Crucial for the detection performance on this channel is the diversity order of the mobile communication system, which should be as large as possible. For trellis coded modulation (TCM) with symbol-interleaving the diversity order is the smallest number of distinct channel symbols along any error event. The diversity order can be further increased by bit-wise interleaving the encoder output before mapping the encoded data bits onto modulation symbols (see for example Ungerboeck, "Trellis-coded modulation with redundant signal sets Part I: Introduction" and "Trellis-coded modulation with redundant signal sets Part II: State of the art", IEEE Communications Magazine, February 1987, Vol. 25, No. 2).

Signal space expansion generalized this concept of bit-interleaving such that a convolutional code of lower rate (larger Hamming distance) can be used giving an even higher diversity order. The same spectral efficiency is maintained by an expansion of the modulation symbol constellation. This concept is also commonly referred to as channel symbol expansion diversity (CSED).

Simulation results have indicated that this approach leads to coded modulation schemes experiencing a significantly better performance on the Rayleigh fading channel than the symbol- or bit-interleaved TCM-systems of comparable complexity.

Signal space (or Signal-Set) expansion thus allows avoiding spectral expansion of the transmitted data. For example in a coded system, k information bits are encoded into n coded bits prior to transmission. If this data is to be transmitted within a fixed time interval T, one approach is to expand the transmission bandwidth (or spectrum) by a factor of n/k compared to the transmission of the information bits only.

Alternatively—according to the approach taken by CSED—the transmission bandwidth is kept unchanged, but the number of data bits mapped to a modulation symbol is expanded by a factor of n/k. As an example, instead of transmitting an uncoded sequence of k bits using BPSK, a coded sequence of rate ½ may be used to transmit n=2 k bits using QPSK. Apparently both schemes require the same amount of symbols to be transmitted per time period for an identical data rate.

It should be apparent to those skilled in the art that an expansion can likewise occur to increase the amount of redundancy of a coded system even further. For example instead of transmitting a rate ⅔ system with 8-PSK, a signal space expansion scheme of rate ¾ with 16-QAM may be used.

16-QAM

16-QAM (Quadrature Amplitude Modulation) is a digital modulation scheme which is commonly used for example in IMT 2000 based mobile communication systems, such as UMTS or CDMA 2000. The 16 modulation symbols are defined by distinct points in the complex signal space in which the 16-QAM constellation is commonly illustrated. Each of these points represents one 16-QAM symbol.

For binary information transmission systems, four different bits may be used to determine one of the existing 16-QAM symbols. Therefore one 16-QAM symbol consists (or can be represented by a word) of 4 bits, and is represented by a complex value in the complex plane. Generally the complex value of a modulation symbol can be represented by its Cartesian inphase- and quadrature-components (I and Q components) relative to the respective I-axis and Q-axis in the complex plane. These axes also divide the complex plane in four quadrants. The representation of a modulation symbol by its real and imaginary part in the complex plane is equivalent to its representation by polar components, i.e. radius and angle.

For a better understanding of the invention, it is assumed here a specific constellation of the 16-QAM symbols, where the signal points within a quadrant of the complex plane are arranged such that they form a square of four points in two orthogonal directions of the signal space. Consequently such a mapping is commonly known as square 16-QAM or lattice 16-QAM. Two examples are given in FIG. 1 and FIG. 2.

The invention assumes that the 16-QAM symbols are arranged using a square 16-QAM mapping. It should be apparent to the skilled person that for each rotated 16-QAM constellation as for example shown in FIG. 2, the axes of the complex plane may be chosen such that the rotated 16-QAM constellation can be viewed as in FIG. 1.

Commonly, the so-called Gray mapping is used to associate the 16 modulation symbols in a 16-QAM constellation with a quadruple of bits which is mapped to the respective symbol. According to this Gray mapping scheme, adjacent modulation symbols in the horizontal or vertical direction differ in one bit only.

Set Partitioning/Trellis Coded Modulation

Trellis-Coded Modulation (TCM) has evolved over the past decade as a combined coding and modulation technique for digital transmission over band-limited mobile communication channels. TCM allows significant coding gains over conventional uncoded modulation without compromising bandwidth efficiency (see for example Hansson et al., "Channel Symbol Expansion Diversity—Improved Coded Modulation for the Rayleigh Fading Channel", IEEE International Conference on Communications, 1996 (ICC 96), Conference Record, Converging Technologies for Tomorrow's Applications. 1996, pages 891-895, vol. 2).

Trellis Coded Modulation (TCM) schemes employ redundant nonbinary modulation in combination with a finite-state encoder which governs the selection of modulation signals to generate coded signal sequences. A block diagram structure is given in FIG. 4. The essential concept of TCM is to use signal-set expansion to provide redundancy for coding, and to design coding and signal-mapping functions jointly so as to maximize directly the minimum Euclidean distance between coded signal sequences.

The concept of set partitioning is of central significance for TCM schemes. Set partitioning divides a signal set successively into smaller subsets with maximally increasing smallest intra-set distances.

TCM uses traditionally convolutional codes as coding schemes. An enhanced concept called Turbo Trellis Coded Modulation (TTCM) uses turbo codes as coding scheme.

Performance Evaluation

As shown in Ungeberboeck, "Trellis-coded modulation with redundant signal sets Part I: Introduction", the resulting bit error rate of a signal coded and modulated according to a TCM scheme is improved in comparison to the uncoded transmission of the signal using a lower order modulation scheme.

However, the TCM is commonly not used in mobile communication systems, such as UMTS, since the encoder and in particular the decoder complexity required for TCM is very high. The complex structure of encoders and decoders for TCM require a not neglectable amount of processing power which in turn requires the presence of sufficient battery power in the terminal. As both resources are commonly scarce resources in mobile terminals, the use of TCM has not succeeded in mobile communications.

For example, TCM (signal space expansion) is not used in UMTS. Instead, signals are commonly modulated using QPSK or 16-QAM with Gray mapping (see 3GPP TS 25.213: "Spreading and modulation (FDD) (Release 6)", V6.0.0, section 5.1, Table 3A, available at http://www.3gpp.org).

SUMMARY OF THE INVENTION

It is therefore a main object of the invention to provide a modulation and coding scheme using a signal space expansion and 16-QAM which improves the bit-error rate in comparison to QPSK modulated signals. Another object, as far as mobile communication systems are concerned, is to provide the possibility to implement coders and decoders with low complexity.

The main object is solved by the subject matters of the independent claims. Advantageous embodiments are subject matter to the dependent claims.

One key aspect of the invention is to use a 16-QAM constellation with predetermined mapping rules together with repetition coding (signal space expansion) and interleaving of the data stream to be transmitted. The mapping rules define which of sixteen quadruples of bits (also referred to data words) is mapped to which modulation symbol (also referred to as data symbol) of the 16-QAM constellation. The 16 modulation symbols may for example be represented in four rows and four columns in a complex coordinate plane.

For example, the mapping rules may be formulated as follows:
a) a first one of the four data bits representing a modulation symbol selects one of two contiguous symbol regions of the 16-QAM constellation based on its logical value, each of the two contiguous symbol regions being formed by two rows adjacent to each other
b) a second one of the four data bits representing the respective modulation symbol selects one of two contiguous symbol regions of the 16-QAM constellation based on its logical value, each of the two contiguous symbol regions being formed by two columns adjacent to each other
c) a third one of the four data bits representing the respective modulation symbol selects one of two non-contiguous symbol regions of the 16-QAM constellation based on its logical value, each of the two non-contiguous symbol regions being formed by two rows not adjacent to each other
d) a fourth one of the four data bits representing the respective modulation symbol selects one of two non-contiguous symbol regions of the 16-QAM constellation based on its logical value, each of the two non-contiguous symbol regions being formed by two columns not adjacent to each other It is important to notice, that these mapping rules do not require that for example the most significant bit of a quadruple of bits representing a modulation symbol selects a specific one the regions defined in the rules above according to its logical value. Which bit of the quadruple selects which of the four regions defined within four above mentioned mapping rules does not have an impact on the performance of the modulation and coding scheme proposed by the invention, as long as it is further ensured that the criteria outlined below are also met.

An alternative definition of the mapping rules, equivalent to the rules a), b), c) and d) above, may be formulated as follows. It is assumed that the axes of the complex plane in which the square 16-QAM constellation can be represented are chosen as shown in FIG. 1. The axes divide the complex signal space in four quadrants. Assuming this representation of the 16-QAM constellation, the mapping rules of the QAM constellation fulfill the following criteria:
a') the Hamming distance between modulation symbols within a quadrant having the minimum Euclidian distance to each other is one
b') the Hamming distance between modulation symbols of adjacent quadrants having the minimum Euclidian distance to each other is two and
c') the modulation symbols being antipodal to each other with respect to the origin of the complex coordinate plane have a Hamming distance of four Moreover, the following additional rules may be considered:
d') the modulation symbols within a quadrant having an Euclidian distance larger than the minimum Euclidian distance or equal to the square root of two times the minimum Euclidian distance to each other within the quadrant have a Hamming distance of two
e') the Hamming distance between modulation symbols having an Euclidian distance larger than the minimum Euclidian distance or equal to the square root of two times the minimum Euclidian distance to each other of and being located in adjacent quadrants is three In addition to these alternative but equivalent mapping rules, another aspect of the invention is to perform an interleaving of the data after repetition coding and prior to their mapping to the modulation symbols for transmission. In the mapping of the data to the modulation symbols it is further ensured, that an individual bit of the data to be transmitted selects a contiguous symbol region and its repeated version obtained by repetition coding selects a non-contiguous symbol region, or vice versa.

According to one embodiment of the invention a method for transmitting a data bit stream in a communication system using a 16-QAM constellation is provided. The 16-QAM constellation has 16 modulation symbols that can be represented in four rows and four columns in a complex coordinate plane. Each modulation symbol of the 16-QAM constellation can be represented by a combination of four data bits.

The 16-QAM constellation according to this embodiment obeys the mapping rules a), b), c) and d) outlined above.

In a first step the number of data bits of the data bit stream is expanded by repeating the data bits of the data bit stream. Thereby, a repeated data bit stream is formed, which comprises, for each data bit of the data bit stream, a repeated data bit associated to the respective data bit of the data bit stream.

Next, either one of or both, the data bit stream or the repeated data bit stream are interleaved. Further, a sequence of data words is formed from the data bit stream and the repeated data bit stream and each data word is mapped to a modulation symbol of the 16-QAM constellation. According to this embodiment, each data word has four bits. Two bits of a respective data word are formed by data bits of the data bit stream and two bits of the respective data word are formed by data bits of the repeated data bit stream. For a data bit of the data bit stream a contiguous symbol region is selected and for its associated repeated data bit of the repeated data bit stream a non-contiguous symbol region is selected, or vice versa.

The modulation symbols are modulated to a carrier frequency and are transmitted.

According to a variation of the embodiment, the two data bits from the data bit stream within a data word form the most significant bits of the respective data word and the two data bits from the repeated data bit stream within the respective data word form the least significant bits of the respective data word, or vice versa.

The most significant bits of the data word may select one of the contiguous symbol regions, respectively, and the least significant bits of a data word select one of the non-contiguous symbol regions, respectively, or vice versa.

According to a further embodiment of the invention, the data bit stream is segmented into a sequence of data bit groups. In this embodiment, the data is processed on the data bit group level. Accordingly, the number of data bits of the data bit stream is expanded by repeating each of the data bit groups, and the repeated data stream forms a sequence of repeated data bit groups. Also interleaving is performed per data bit group, i.e. on a data bit group level.

In a variation of this further embodiment, a respective one of the data bit groups and a respective one of the repeated data bit groups consist of two data bits of the data bit stream and two data bits of the repeated data bit stream. The data bits of at least one of the data bit groups or the repeated data bit groups may be permuted prior to forming a sequence of data words.

Generally, it should be noted that in the embodiments of the invention above, a data bit of the data bit stream and its associated repeated data bit in the repeated data bit stream may be mapped onto the same modulation symbol or onto different modulation symbols.

Moreover, it is also possible in the embodiments above, to encode the data bit stream prior to expanding the number of bits using a forward error correction encoder, such as convolutional encoder, a turbo encoder or a block encoder.

Another embodiment of the invention provides a method for receiving a data bit stream in a communication system. In this embodiment, it is assumed that the data bit stream has been modulated by a transmitter using a 16-QAM constellation having 16 modulation symbols that can be represented in four rows and four columns in a complex coordinate plane. Each modulation symbol of the 16-QAM constellation can be represented by a combination of four data bits. Further, the 16-QAM constellation used for modulation at the transmitter obeys the mapping rules a), b), c) and d), as defined above.

First, a transmission signal comprising the data bit stream is received and demodulated by detecting modulation symbols represented by data words of four data bits using the 16-QAM constellation. Thereby each data bit of a received modulation symbol is associated with a metric indicating the probability of the logical value of the respective bit of the received modulation symbol or indicating the logical value of the respective bit of the received modulation symbol. It is further possible, that the metric indicates the probability of the logical value of the respective bit of the received modulation symbol and indicating the logical value of the respective bit of the received modulation symbol Further, the receiver is aware of the relation between a transmitted data bit and the transmitted repeated version of the data bit together forming a so-called associated bit pair. In particular, the receiver is aware that one of the bits of the associated bit pair is transmitted selecting one of the contiguous symbol regions, while the other bit of the associated bit pair is transmitted selecting one of the non-contiguous symbol regions. Therefore the receiver can derive a metric for a data bit by exploiting said relation between the transmitted data bits. Hence, each data bit of the received modulation symbols that has selected one of the contiguous (or non-contiguous) symbol regions of the 16-QAM constellation can be associated with a repeated data bit representing its repetition within the data bits of the modulation symbols. As explained above, the repeated data bit has selected one of the non-contiguous (or contiguous) symbol regions of the 16-QAM constellation. Each data bit having selected one of the contiguous (or non-contiguous) symbol regions of the 16-QAM constellation may be combined with its associated repeated data bit based on the metric of the respective data bit and the metric of the repeated data bit to reconstruct the data bit stream.

The step of combining each data bit having selected one of the contiguous (or non-contiguous) symbol regions may comprise forming for each data bit having selected one of the contiguous (or non-contiguous) symbol regions a combined metric based on the metric of the respective data bit and the metric of the repeated data bit, and decoding the combined data bits of the data bit stream using the combined metric to reconstruct the data bit stream.

Another embodiment of the invention provides an apparatus for transmitting a data bit stream via a radio channel of a communication system using a 16-QAM constellation having 16 modulation symbols that can be represented in four rows and four columns in a complex coordinate plane. Again, each modulation symbol of the 16-QAM constellation can be represented by a combination of four data bits. Further the 16-QAM constellation obeys the mapping rules a), b), c) and d) as provided above.

The transmitting apparatus may comprise a signal space expansion means for expanding the number of data bits of the data bit stream by repeating thereby forming a repeated data bit stream comprising for each data bit of the data bit stream a repeated data bit associated to the respective data bit of the data bit stream, an interleaver for interleaving at least one of the data bit stream or the repeated data bit stream, and processing means, for example a processor, DSP or the like, for forming a sequence of data words from the data bit stream and the repeated data bit stream, The processing means may be adapted to map each data word to a modulation symbol of the 16-QAM constellation. Each data word has four bits and two bits of the respective data word are formed by data bits of the data bit stream and two bits of the respective data word are formed by data bits of the repeated data bit stream. Moreover, a data bit of the data bit stream selects a contiguous symbol region and its associated repeated data bit of the repeated data bit stream selects a non-contiguous symbol region, or vice versa.

The transmitting apparatus may further comprise a modulator for the symbols to a carrier frequency and a transmitter for transmitting the modulated symbols.

In a further embodiment of the invention, the transmitting apparatus further comprises means adapted to perform the steps of the method for transmitting a data bit stream in a communication system according to one of the various embodiments and their variations outlined above.

An embodiment of the invention relates to an apparatus for receiving a data bit stream via a radio channel of a communication system. Again, the data bit stream has been modulated by a transmitting apparatus using a 16-QAM constellation having 16 modulation symbols that can be represented in four rows and four columns in a complex coordinate plane. Each modulation symbol of the 16-QAM constellation can be represented by a combination of four data bits, and the 16-QAM constellation obeys mapping rules according to the definitions in a), b), c) and d) above.

The receiving apparatus may comprise a receiver for receiving a transmission signal comprising the data bit stream, and a demodulator for demodulating the transmission signal by detecting modulation symbols represented by data words of four data bits using the 16-QAM constellation, thereby associating each data bit of a received modulation symbol with a metric indicating the probability of the logical value of the respective bit of the received modulation symbol and/or indicating the logical value of the respective bit of the received modulation symbol.

Further, the apparatus may comprise a processing means for associating each data bit of the received modulation symbols that has selected one of the contiguous (or non-contiguous) symbol regions of the 16-QAM constellation, to a repeated data bit representing its repetition within the data bits of the modulation symbols, wherein the repeated data bit has selected one of the non-contiguous (or contiguous) symbol regions of the 16-QAM constellation. Moreover, the apparatus may also comprise a reconstruction means for combining each data bit that has selected one of the contiguous symbol regions (or non-contiguous symbol region) of the 16-QAM constellation with its associated repeated data bit based on the metric of the respective data bit and the metric of the repeated data bit to reconstruct the data bit stream.

In another embodiment of the invention, the reconstruction means is adapted to form for each data bit having selected one of the contiguous (or non-contiguous) symbol regions a combined metric based on the metric of the respective data bit and the metric of the repeated data bit, and the receiving apparatus further comprises a decoder for decoding the combined data bits of the data bit stream using the combined metric to reconstruct the data bit stream.

A further embodiment of the invention is related to a computer readable medium storing instruction that, when executed by a processor of a transmitting apparatus, cause the transmitting apparatus to transmit a data bit stream via a radio channel of a communication system using a 16-QAM constellation having 16 modulation symbols can be represented in four rows and four columns in a complex coordinate plane, wherein each modulation symbol of the 16-QAM constellation can be represented by a combination of four data bits and the 16-QAM constellation obeys the mapping rules as outlined in a), b) c) and d) above.

The computer-readable medium further stores instructions that, when executed by the processor of a transmitting apparatus, cause the transmission of a data bit stream by expanding the number of data bits of the data bit stream by repeating thereby forming a repeated data bit stream comprising for each data bit of the data bit stream a repeated data bit associated to the respective data bit of the data bit stream, interleaving at least one of the data bit stream or the repeated data bit stream, and forming a sequence of data words from the data bit stream and the repeated data bit stream and mapping each data word to a modulation symbol of the 16-QAM constellation. Each data word has four bits and two bits of the respective data word are formed by data bits of the data bit stream and two bits of the respective data word are formed by data bits of the repeated data bit stream. Moreover, a data bit of the data bit stream selects a contiguous symbol region and its associated repeated data bit of the repeated data bit stream selects a non-contiguous symbol region, or vice versa. The transmitting apparatus may be further caused to transmit a data bit stream by modulating the symbols to a carrier frequency and transmitting the modulated symbols.

Moreover, in another embodiment of the invention, the computer-readable medium further stores instructions that, when executed by the processor of a transmitting apparatus, cause the transmitting apparatus to perform the steps of the method of transmitting the data bit stream according to one of the above-mentioned various embodiments of the invention and variations thereof.

A further embodiment of the invention provides a computer readable medium storing instructions that, when executed by a processor of a receiving apparatus, cause the receiving apparatus to receive a data bit stream via a radio channel of a communication system. The data bit stream has been modulated by a transmitter using a 16-QAM constellation having 16 modulation symbols that can be represented in four rows and four columns in a complex coordinate plane and each modulation symbol of the 16-QAM constellation can be represented by a combination of four data bits. Moreover, the 16-QAM constellation obeying the mapping rules as outlined in a), b), c) and d) above.

The receiving apparatus is caused to receive a data bit stream by receiving a transmission signal comprising the data bit stream, demodulating the transmission signal by detecting modulation symbols represented by data words of four data bits using the 16-QAM constellation, thereby associating each data bit of a received modulation symbol with a metric indicating the probability of the logical value of the respective bit of the received modulation symbol and/or indicating the logical value of the respective bit of the received modulation symbol, associating each data bit of the received modulation symbols that has selected one of the contiguous (or non-contiguous) symbol regions of the 16-QAM constellation, to a repeated data bit representing its repetition within the data bits of the modulation symbols: The repeated data bit has selected one of the non-contiguous (or contiguous) symbol regions of the 16-QAM constellation. Each data bit having selected one of the contiguous (or non-contiguous) symbol regions of the 16-QAM constellation is combined with its associated repeated data bit based on the metric of the respective data bit and the metric of the repeated data bit to reconstruct the data bit stream.

In another embodiment, the computer readable medium may further storing instructions that, in the step of combining each data bit having selected one of the contiguous (or non-contiguous) symbol regions, cause the processor of the receiving apparatus to form for each data bit having selected one of the contiguous (or non-contiguous) symbol regions a combined metric based on the metric of the respective data bit and the metric of the repeated data bit, and to decode the combined data bits of the data bit stream using the combined metric to reconstruct the data bit stream.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

The following paragraphs will describe various embodiments of the present invention. For exemplary purposes only, most of the embodiments are outlined independent from their implementation in a mobile environment. However, it is to be noted that the invention may be especially applicable to wireless or mobile networks, such as a UMTS communication system, WLAN, etc. in which the mobile devices have limited battery power and processing resources.

Also the detailed explanations given in the Technical Background section above are merely intended to better understand the exemplary embodiments described in the following and should not be understood as limiting the present invention to the described specific implementations of processes and functions in the mobile communication network.

One main aspect of the invention is to employ a specially selected 16-QAM mapping structure in combination with a simple word repetition (signal space expansion) and interleaving. This combination signal space expansion and interleaving together with a specially adapted mapping of the data to transmit to modulation symbols has beneficial effects on the simplicity of the whole transmitter and receiver chain and may significantly improve the transmission performance compared to prior art systems.

The present invention proposes a strategy which allows the use of Signal Space Expansion to 16-QAM mapping with improved performance compared to prior art solutions that employ Gray Mapping with signal set expansion and/or TCM. To implement a simple encoding and decoding scheme for receiver and transmitter, a repetition coding is used for signal space expansion instead of the more sophisticated, but also more complex coding and decoding schemes used in TCM. Studies and simulations have shown that the mapping that gives optimum performance for such a simple system requires the use of a non-standard non-Gray mapping scheme.

Before further elaborating on the different aspects of the invention, a short overview of the encoding and decoding scheme according to one embodiment of the invention is provided in the following.

Figure 22:
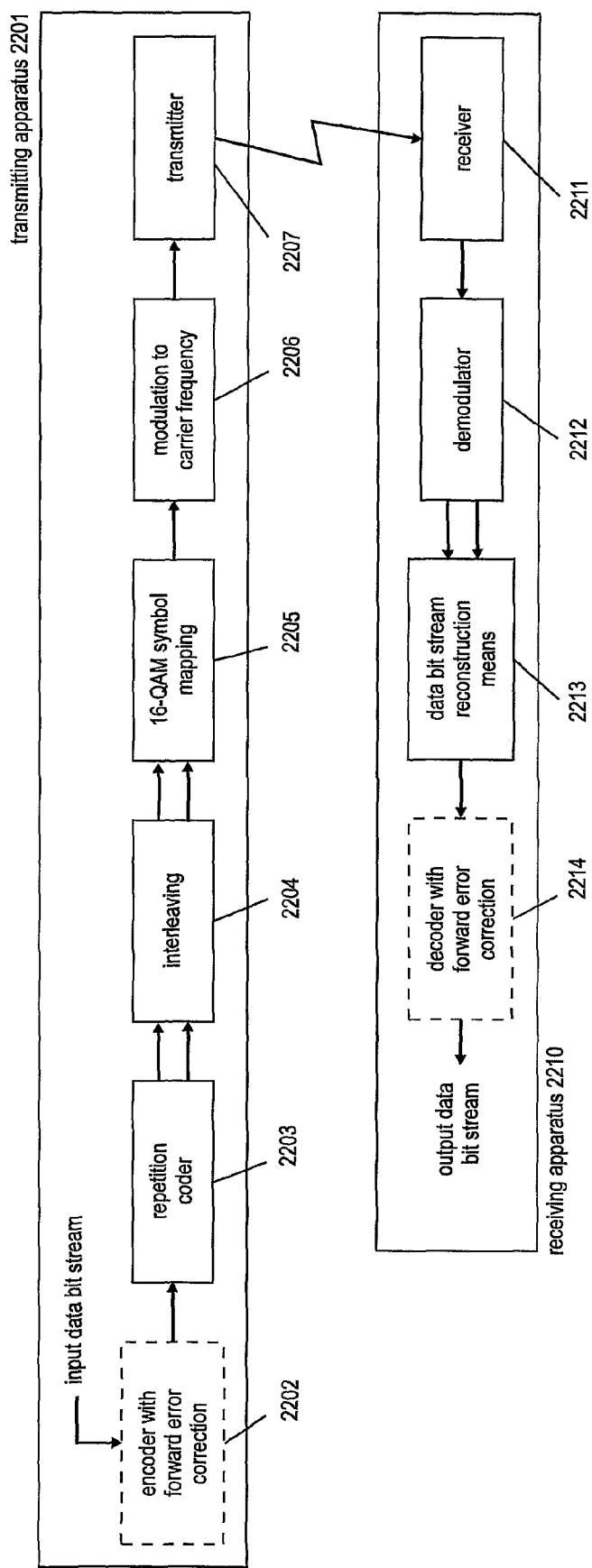
FIG. 22 shows an exemplary transmitter and receiver block diagram according to an embodiment of the invention.

FIG. 22 shows a transmitting apparatus 2201 and a receiving apparatus 2210 according to one embodiment of the invention. In the transmitting apparatus 2201, an input data stream is provided from a higher layer. The input data stream may for example be voice from an ongoing voice communication or any type of data communication. Optionally, the input data stream may be encoded in an encoder 2202 employing forward error correction. For example, the encoder 2202 may be a convolutional encoder, a turbo encoder, or block encoder. Next, the input data stream is input to the repetition coder 2203 which repeats the bits of the input data stream and outputs the input data stream and a second data stream comprising copies of the data bits of the data bit stream.

Both data bit streams, the input data bit stream and the repeated data bit stream, are further provided to an interleaver 2204 which interleaves either one or both of the two data bit streams. The interleaver 2204 outputs the two data bit streams to a 16-QAM mapping means 2205, in which the data bits of both data bit streams are mapped to one of the 16 modulation symbols in units of four bits (quadruples). Further down below, the mapping of the input data bit stream and the repeated data bit stream onto the modulation symbols will be further elaborated on in more detail.

After having been mapped to modulation symbols, the data is modulated onto a carrier frequency (or multiple carrier frequencies when considering an OFDM type communication system) in the modulator 2206 and is transmitted by transmitter 2207 via a radio channel (or radio channels).

Before elaborating in further detail on the receiver side structure of the receiving apparatus 2210, details on the operation and structure of the transmitting apparatus 2201 will be provided in the following.

One aspect of the invention is the definition of mapping rules of the 16-QAM constellation. For a better understanding of the further elaboration on the properties of the new mapping, the definitions of several terms frequently used in the following are provided: The Hamming weight of a symbol composed of binary elements 0 and 1 (alternatively denoted −1 and 1) is the number of non-zero (i.e. 1) elements within a word composed of binary elements. Consequently for any 4-bit word that is mapped onto a 16-QAM symbol the Hamming weight can be an integer value of 0 (i.e. for the word "0000"), of 1 (e.g. for the word "0010"), of 2 (e.g. for the word "1010"), of 3 (e.g. for the word "1110"), or of 4 (i.e. for the word "1111"). An even Hamming weight value is also denoted an "even Hamming parity", an odd Hamming weight value is denoted an "odd Hamming parity".

Figure 8:
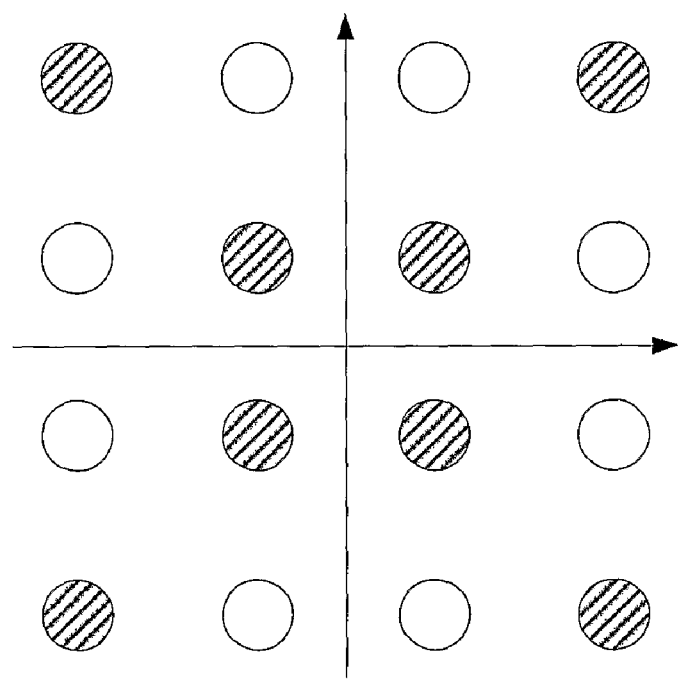
FIG. 8 shows an exemplary mapping of data words with even and odd Hamming weight onto constellation points of a 16 QAM constellation according to an embodiment of the invention.

FIG. 8 shows a mapping of even and odd Hamming weight words onto constellation symbols according to one embodiment of the invention. In the constellation shown in FIG. 8, a special 16-QAM mapping that is used in conjunction with repetition coding and interleaving should fulfil at least the following properties:

a") All words that have a first Hamming weight parity are unambiguously mapped either onto the dashed or the white modulation symbols in FIG. 8.

b") All words that have a second Hamming weight parity are unambiguously mapped either onto the dashed or the white modulation symbols in FIG. 8.

c") The above two properties are complementary to each other, i.e. if the even Hamming weight words are mapped onto the dashed modulation symbols, then the odd Hamming weight words are mapped onto the white modulation symbols.

d") Rotation of a first constellation symbol by 180 degrees shall result in a second constellation symbol that conveys a second word that is the binary complement of the first word that is conveyed by the first constellation symbol.

As can be seen in FIG. 8, each dashed symbol in a 16-QAM constellation has either two or four nearest neighbour symbols, and each white symbol has three nearest neighbour symbols. Therefore the first two properties above may be reformulated as follows:

a''') All words that have a first Hamming weight parity are unambiguously mapped either onto modulation symbols with two nearest neighbours or with four nearest neighbours.

b''') All words that have a second Hamming weight parity are unambiguously mapped onto modulation symbols with three nearest neighbours.

A noteworthy consequence of these properties is that the Gray principle for closest neighbouring symbols is violated in some cases. Therefore this is called a non-Gray mapping. The last property means that antipodal constellation symbols carry words that are binary inverted. Therefore this mapping is referred to as Antipodal Inverted Constellation Mapping, or AICO Mapping for short. A consequence of the non-Gray characteristic is the difference of symbol regions which specific bits select.

FIG. 11 to FIG. 14 show an exemplary correspondence of the individual bits to symbol regions they select based on their logical value according to an embodiment of the invention. FIG. 11 to FIG. 14 thereby visualize, how an individual bit of a quadruple of data bits mapped to a corresponding modulation bit selects one of the different symbol regions based on its logical value.

Within FIG. 11 to FIG. 14, $S_j^i$ denotes a symbol region, where j is the index denoting data bit number 1, 2, 3, or 4 of a quadruple of data bits to be mapped, and i denotes the logical bit value, either b or its inverse $\bar{b}$; those skilled in the art will appreciate that in this general representation the actual logical bit value (0 or 1, alternatively −1 and 1) or bit position within the word is of no relevance.

Figure 11:
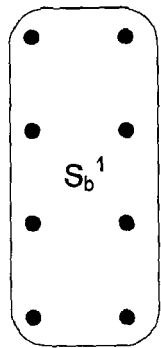
FIGS. 11 to 14 show an exemplary selection of symbol regions of an 16 QAM constellation using AICO mapping by a first, second, third and fourth bit of a data word, respectively, according to an embodiment of the invention.
Figure 11:
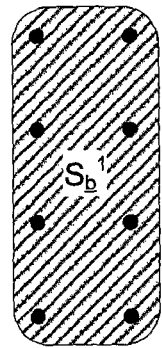
Figure 12:
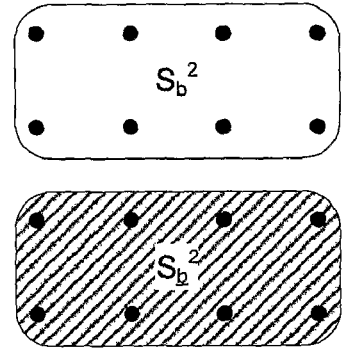
Figure 13:
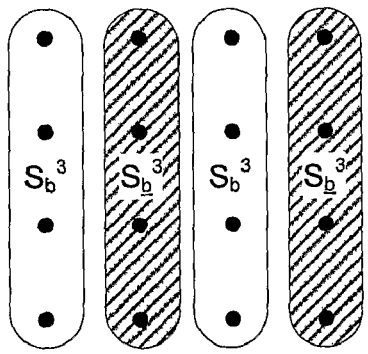
Figure 14:
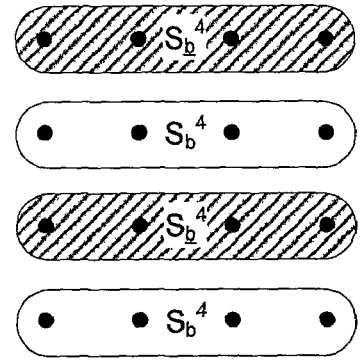
Figure 15:
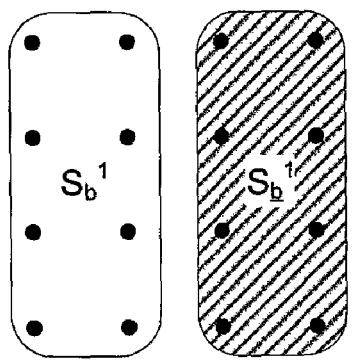
FIGS. 15 to 18 show an exemplary selection of symbol regions of an 16 QAM constellation using Gray mapping by a first, second, third and fourth bit of a data word.
Figure 17:
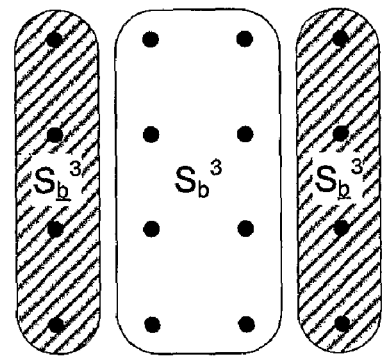
Figure 16:
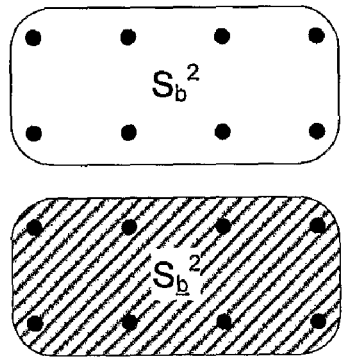
Figure 18:
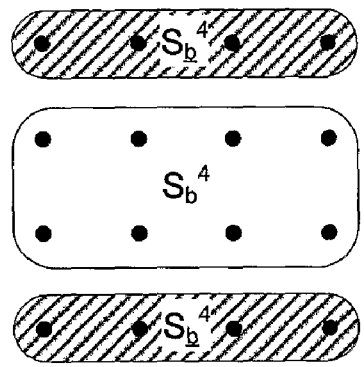

In FIG. 11 an exemplary correspondence of a first data bit of the quadruple of bits to one of two vertically contiguous symbol regions $S_b^1$ and $S_{\bar{b}}^1$ is shown. Based on the logical value b or $\bar{b}$ of the data bit one of the two symbol regions is selected. We may note in particular that there exist two contiguous symbol regions each for two bits $S_b^1$ and $S_{\bar{b}}^1$. Accordingly, FIG. 12 illustrates how a second data bit $\bar{b}$ of the quadruple of bits is mapped to one of two horizontally contiguous symbol regions $S_b^2$ and $S_{\bar{b}}^2$. Hence, two bits of the quadruple of bits (data word) are selecting contiguous symbol regions in the representation of the 16-QAM constellation in the complex plane. Further, FIG. 13 shows an exemplary selection of a third data bit of the quadruple of bits of one of two vertically non-contiguous symbol regions $S_b^3$ and $S_{\bar{b}}^3$ and FIG. 14 shows an exemplary selection of a data fourth bit of the quadruple of bits of one of two horizontally non-contiguous symbol regions $S_b^4$ and $S_{\bar{b}}^4$.

It should be noted that in FIG. 11 to FIG. 14 it is not required that the "first data bit" selecting one of the two contiguous symbol regions $S_b^1$ and $S_{\bar{b}}^1$ in FIG. 11 is equivalent to the most significant bit of the data word. Likewise the "second, third and fourth data bit" do not necessarily have to correspond to the second, third or fourth bit of the data word, respectively. Similarly, the exemplary selection of the symbol regions in FIG. 11 to FIG. 14 may also not be construed as to be limited to the two most significant bits of the data word selecting a respective one of the contiguous symbol regions illustrated in FIG. 11 and FIG. 12, while the two least significant bits of the data word select a respective one of the two non-contiguous symbol regions shown in FIG. 13 and FIG. 14, though this implementation is possible.

To understand the difference of this proposed new mapping scheme to a conventional Gray mapping scheme, the equivalent corresponding symbol regions for a Gray approach are given in FIG. 15 to FIG. 18. It is recognized from FIG. 15 to FIG. 18 that for two out of the four bits of a data word there is no difference in the symbol regions between the Gray and AICO mappings. However for the two remaining bits the symbol regions are different. Depending on the logical bit value, either a modulation symbol from a contiguous or non-contiguous region is used in Gray mapping, but in AICO mapping always a modulation symbol from two non-contiguous regions is used.

Figure 3:
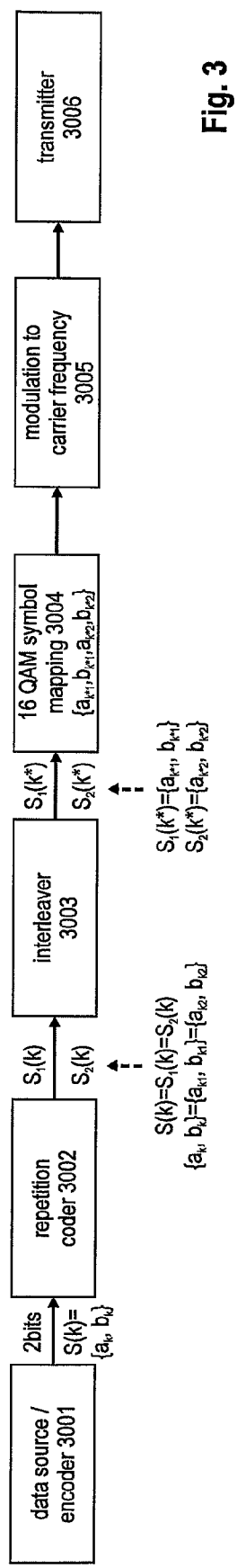
FIG. 3 shows an example of a general signal space expansion from two bits onto four bits using repetition coding and interleaving according to an embodiment of the invention.

As can be seen in from FIG. 11 to FIG. 14, the modulation symbols are arranged in 4 columns of four modulation symbols each, when considering a vertical separation the modulation symbols, and in four rows of modulation symbols each, when considering a horizontal separation the modulation symbols. Based on this exemplary illustration of the 16-QAM constellation shown in FIG. 11 to FIG. 14, the mapping outlined in a") to d") above may alternatively be formulated as:

a) a first one of the four data bits representing a modulation symbol selects one of two contiguous symbol regions of the 16-QAM constellation based on its logical value, each of the two contiguous symbol regions being formed by two rows adjacent to each other b) a second one of the four data bits representing the respective modulation symbol selects one of two contiguous symbol regions of the 16-QAM constellation based on its logical value, each of the two contiguous symbol regions being formed by two columns adjacent to each other c) a third one of the four data bits representing the respective modulation symbol selects one of two non-contiguous symbol regions of the 16-QAM constellation based on its logical value, each of the two non-contiguous symbol regions being formed by two rows not adjacent to each other d) a fourth one of the four data bits representing the respective modulation symbol selects one of two non-contiguous symbol regions of the 16-QAM constellation based on its logical value, each of the two non-contiguous symbol regions being formed by two columns not adjacent to each other Next, another aspect of the invention is discussed in more detail. FIG. 3 shows a very general structure of a signal space expansion scheme within a transmitting apparatus according to one embodiment of the invention. This exemplary signal space expansion scheme leaves great freedom regarding the specific operation of the constituent blocks.

In the first block, a signal source 3001 (e.g. an encoder using forward error correction or a higher layer instance providing a data bit stream to transmit) is assumed to provide two bits $a_k$ and $b_k$ at time instant k. These bits are summarised for simplicity to symbol s(k). The subsequent repetition coder 3002 generates two output words $s_1(k)$ and $s_2(k)$ for one input word $s(k)$, such that $s(k)=s_1(k)=s_2(k)$. In the interleaver 3003 the sequence $(a_k, a_k, b_k, b_k)$ is generally interleaved unambiguously into a new sequence $(a_{k'1}, a_{k'2}, b_{k'3}, b_{k'4})$. Those skilled in the art will perceive that the order of the bits is here of no relevance, since the interpretation of these bits regarding the mapping of bits onto a symbol is depending also on the mapping unit. Each such quadruple of bits is then mapped onto one 16-QAM symbol (block 3004), is modulated to a carrier frequency (block 3005) and transmitted (block 3006).

In the following some requirements according to an exemplary embodiment of the present invention with respect to operation of these two functional blocks 3002, 3003 shown in FIG. 3:

- A bit and its repeated version may be, but preferably are not, mapped onto the same symbol (i.e. within a data block of several symbols, there should be at least one instance of mapping those bits onto different symbols)
- A bit and its repeated version are mapped so that one selects one of two contiguous symbol regions, and the other selects one of two non-contiguous symbol regions
- The mapping of words onto modulation symbols uses an AICO mapping scheme, as outlined above.

Another embodiment of the invention provides another transmitting apparatus structure, as a special case of the scheme shown in FIG. 3 and as discussed above. According to this embodiment of the invention a bit and its repeated version are furthermore mapped onto the same dimension, i.e. I- or Q-component, of the complex signal. This may be achieved by the exemplary transmitting apparatus structures as shown in FIG. 6 and FIG. 7.

Figure 6:
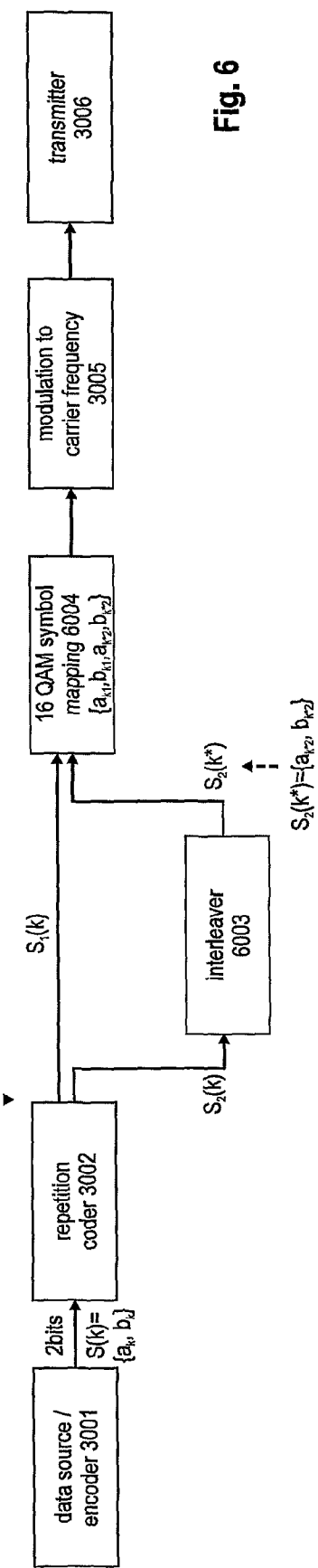
FIG. 6 shows an exemplary transmitter block diagram using a word interleaver according to an embodiment of the invention.
Figure 7:
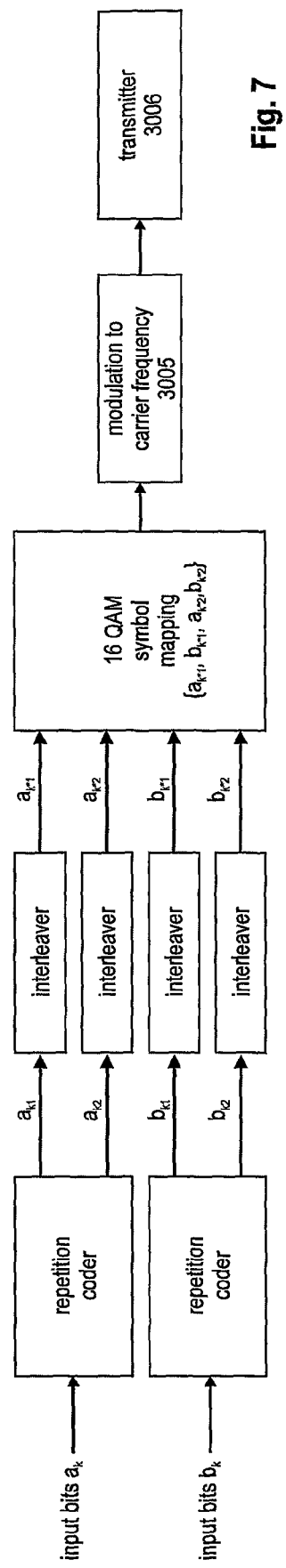
FIG. 7 shows an exemplary transmitter block diagram using a partly independent bit interleaving according to an embodiment of the invention.
Figure 9:
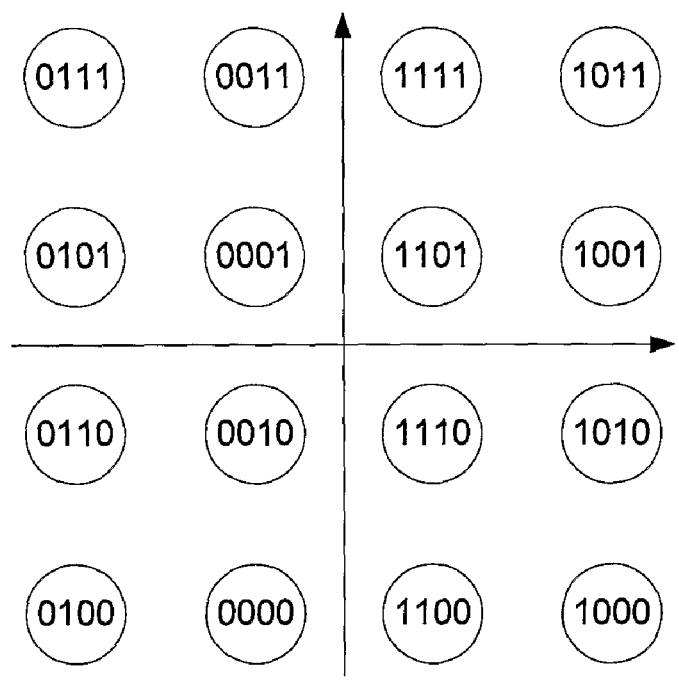
FIGS. 9 and 10 show two exemplary mapping (AICO mapping) of data words to modulation symbols of a 16 QAM constellation according to different embodiments of the invention.
Figure 10:
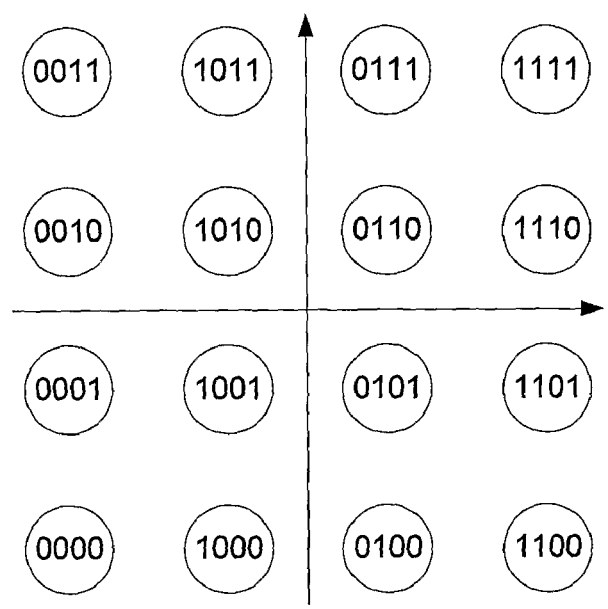

More specifically, FIG. 6 shows a transmitting apparatus structure where the symbol mapping 6004 is performed according to the 16-QAM constellation as for example in provided FIG. 9 or FIG. 10. FIG. 9 and FIG. 10 show different examples of an AICO mapping scheme according to embodiments of the invention, respectively.

In the first logical block, the signal source 3001 provides two bits $a_k$ and $b_k$ at time instant k. These are summarised for simplicity to symbol s(k). The subsequent repetition coder 3002 generates two output words (or bit groups) $s_1(k)$ and $s_2(k)$ for one input word s(k), such that $s(k)=s_1(k)=s_2(k)$. The second repeated version $s_2(k)$ is subsequently interleaved in the interleaver block 6003. It should be noted that according to this exemplary embodiment, the interleaving is performed on a bit-group-level, i.e. the interleaver 6003 permutes the sequence $s_2(k)$ unambiguously into a new sequence $s_2(k^*)$ and/or may permute a data block of sequences $s_2(k), s_2(k+1), s_2(k+2), \ldots$ into a new data block of sequences $s_2(k^*), s_2(k^*+1), s_2(k^*+2), \ldots$. Then the bits $a_k$ and $a_k^*$ are mapped onto the real dimension, while the bits $b_k$ and $b_k^*$ (of the sequence or the sequences in a data block) are mapped onto the imaginary dimension. It should be noted that the data-bit-group size (in the example 2) may be arbitrarily chosen.

The two bits of the I-component may also be denoted $i_1$ and $i_2$, and likewise the Q-component may be denoted $q_1$ and $q_2$. In this notation, $a_k$ and $a_k^*$ may be mapped respectively onto $i_1$ and $i_2$, while $b_k$ and $b_k^*$ bits are mapped respectively onto $q_1$ and $q_2$. Consequently the mappings in FIG. 9 and FIG. 10 show a bit order representing $(i_1, i_2, q_1, q_2)$.

In transmitting apparatus structure shown in FIG. 6, the repeated data bits $a_k^*$ associated to their respective "original" data bits $a_k$ are interleaved. Alternatively, the "original" data bits $a_k$ or both, "original" data bits $a_k$ and repeated data bits $a_k^*$ may be interleaved.

FIG. 7 shows an exemplary transmitting apparatus structure according to another embodiment of the invention where the interleaving is "bit-based". Generally the same notation as in FIG. 6 is used. However, the interleaving is now performed symbol-wise, i.e. whole symbols are interleaved, but not the bits within a symbol. In literature this is also referred to as "Inter-Symbol Interleaving". Again bits $a_k$ and $a_k^*$ are mapped onto the real dimension and bits $b_k$ and $b_k^*$ are mapped onto the imaginary dimension, as shown for example in FIG. 9 or FIG. 10 assuming again a bit order of $(i_1, i_2, q_1, q_2)$.

The improvement achieved by the use of the proposed transmitting apparatus structures shown in FIG. 6 and FIG. 7 has been proven by numerical Monte Carlo simulations. The results are given in FIG. 19 for the case of an AWGN channel and for the case of a one path uncorrelated Rayleigh fading channel in FIG. 20 and FIG. 21.

Figure 19:
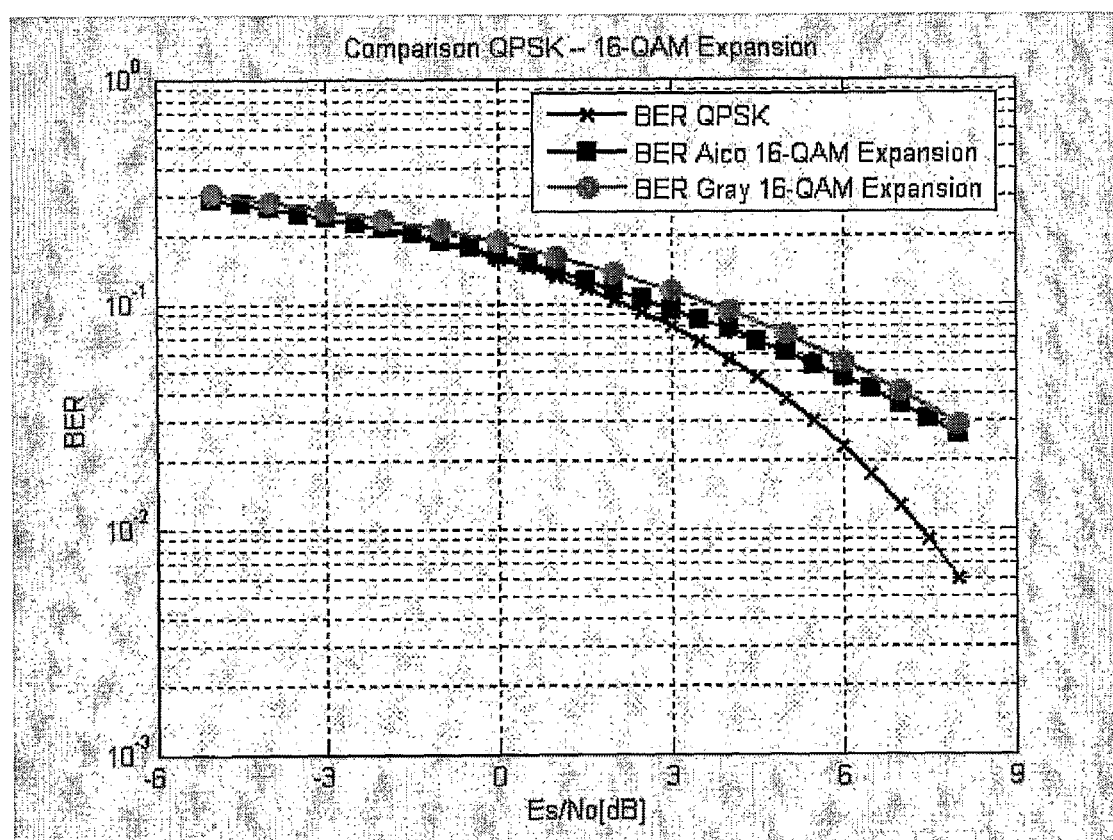
FIG. 19 shows results of a simulation of the bit-error performance of a conventional QPSK mapping, a Gray 16 QAM mapping and an AICO 16 QAM mapping according to an embodiment of the invention in an AWGN channel.

In particular it can be recognized from FIG. 19 that the proposed transmitting apparatus structure can achieve an improved performance against a Gray mapping approach over the whole simulated Es/No range. For a low $E_s/N_0$ the transmitting apparatus structures according to the different embodiments above can achieve the same performance as a QPSK system without repetition and expansion, and even for a medium $E_s/N_0$ the loss of the proposed schemes is very small.

Figure 20:
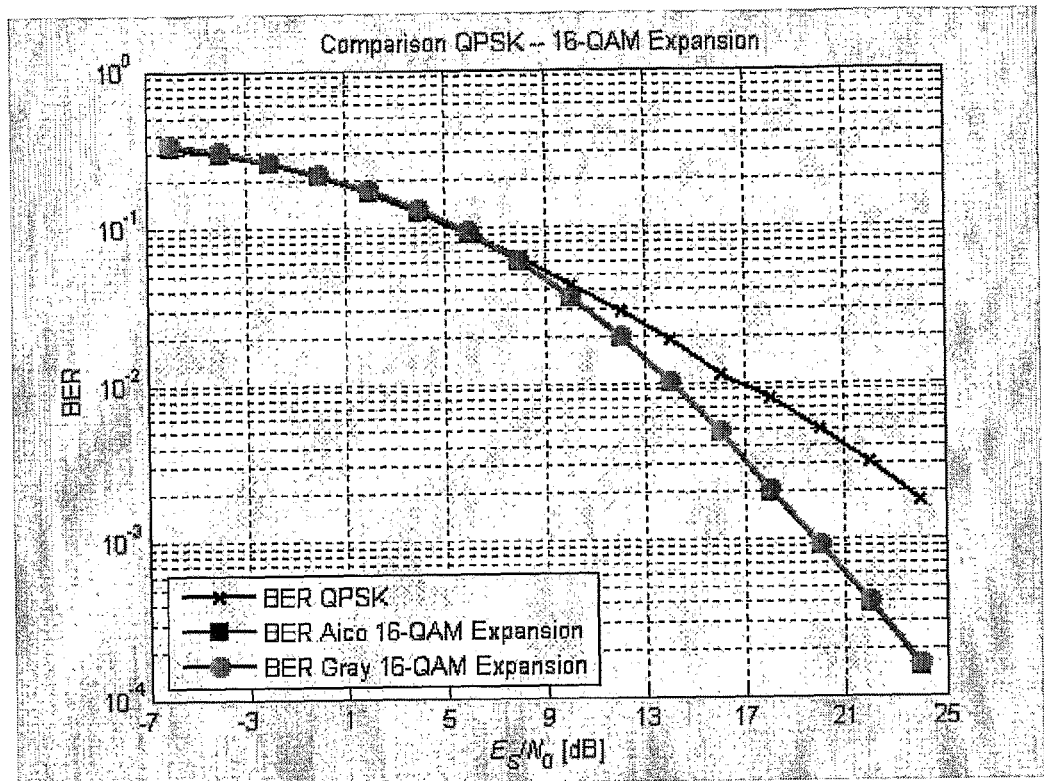
FIG. 20 shows results of a simulation of the bit-error performance of a conventional QPSK mapping, a Gray 16 QAM mapping and an AICO 16 QAM mapping according to an embodiment of the invention in a Rayleigh fading channel.
Figure 21:
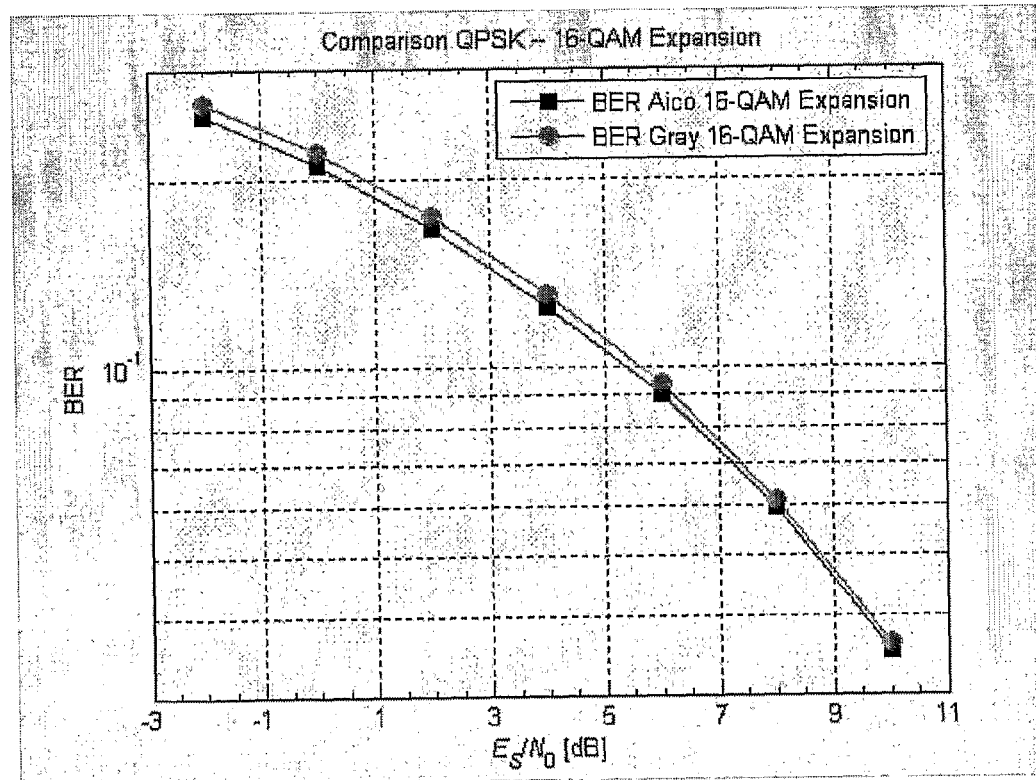
FIG. 21 shows a cut out of results of a simulation of the bit-error performance of a Gray 16 QAM mapping and an AICO 16 QAM mapping according to an embodiment of the invention in a Rayleigh fading channel shown in FIG. 20.

However in FIG. 20 and particularly in FIG. 21 it can be recognized that the proposed structures both have a better performance in terms of the bit error rate than transmitting apparatuses using a Gray mapping scheme with signal space expansion approach and transmitting apparatuses employing QPSK without signal space expansion.

It should be recognized that for the operation of the transmitting apparatus according to the various embodiments above, the interleaving scheme used may be arbitrarily chosen, as long as it is ensured that data bits of the input data stream select contiguous symbol regions (see e.g. FIGS. 11 and 12) while the repeated data bits generated by the repetition coder and forming a repeated data bit stream select non-contiguous symbol regions (see e.g. FIG. 13 and FIG. 14).

Alternatively the interleaving scheme used may be arbitrarily chosen, as long as it is ensured that data bits of the input data stream select non-contiguous symbol regions (see e.g. FIGS. 13 and 14) while the repeated data bits generated by the repetition coder and forming a repeated data bit stream select contiguous symbol regions (see e.g. FIGS. 11 and 12). In a further alternative embodiment of the invention the interleaving may be arbitrarily chosen, as long as it is ensured that a data bit of the input data stream and its respective repeated data bit select one contiguous symbol region and one non-contiguous symbol region.

Generally, it is to be noted that it is only relevant for the receiving apparatus to identify the data bits pairs belonging together. Whether the bits of the modulation symbols are associated to the correct data bit stream as provided by the transmitting apparatus is not of particular relevance as long as it may be ensured that data bits and their repetitions may be associated to each other at the receiving apparatus.

Returning now to FIG. 22, receiving apparatus structure will now be described in further detail. According to one embodiment of the invention, the receiver 2211 of the receiving apparatus 2210 receives the signal transmitted by the transmitting apparatus 2201. The received signal is output to a demodulator 2212, which detects the individual modulation symbols in the signal. In other words, the demodulator associates signal portions of a fixed duration to a quadruple of bits according to the 16-QAM constellation used by the transmitting apparatus 2201. Obviously, the receiving apparatus 2210 needs to be made aware of or is aware of the symbol mapping used by the transmitting apparatus in order to be able to reverse the mapping of modulation bits to data words (bit quadruples).

The demodulator 2212 also associates each bit of the data words with a metric allowing to reconstruct the logical value of the individual data bits of the received data words. The content of this metric for each data bit in the data words depends on the decoding strategy used, as will be elaborated on further down below. The demodulator 2212 may be further aware of or may be made aware of the interleaving scheme used by the interleaver 2204 at the transmitting apparatus 2201 (e.g. by predefining the interleaving pattern or by means of control signalling). Based in the knowledge of the interleaving scheme used at the transmitting apparatus 2201, the demodulator 2212 may further associate the individual bits that correspond to data bits of the input data stream on the transmission side to their respective repeated versions, i.e. the repeated data bits, of the repeated data bit stream on the transmission side. The data words, the metrics of the individual data bits therein as well as the information on associated data bit pairs is provided to the data bit stream reconstruction means 2213, which combines the data bit pairs based on the metrics to reverse the signal space expansion by the repetition coder 2203.

If the input data bit stream has been encoded on the transmission side, the receiving apparatus 2210 further comprises a decoder 2214 to decode the data stream provided by the data bit stream reconstruction means 2213.

It should be noted that the structure of the individual components of the receiving apparatus 2210 will depend on the demodulation/decoding scheme employed at the individual receiving apparatus 2210. Important for the correct reconstruction of the original input data bit stream transmitted by the transmitting apparatus is that the receiving apparatus 2210 is able to provide a reverse mapping of the modulation symbols to data words, to associate each of the data bits or each of the data words with a metric and to detect the data bit pairs—each formed by a data bit of the input data stream and its repeated version in the repeated data bit stream—within the data words. Hence, instead of the demodulator 2212, the data bit reconstruction means 2213 may provide the above mentioned association of the individual bits that correspond to data bits of the input data stream on the transmission side to their respective repeated versions, i.e. the repeated data bits, of the repeated data bit stream on the transmission side. Alternatively, instead of the demodulator 2212 the receiving apparatus 2210 may be provided with a de-interleaver between a demodulator and a data bit reconstruction means, which separates data words into a data bit stream and a repeated data bit stream and determines information on the data bit pairs belonging together in the two data bit streams.

It has been also mentioned above that depending on the receiver strategy, the metrics associated to the individual bits in the data words may have different contents of the metric. For example, if the decoding is performed using soft-values, the metric may indicate a probability value or probability values indicating the probability of whether an individual data bit has a logical value of −1 or 1. For this purpose, the metric may be for example a log likelihood ratio (LLR) which is defined by $$LLR(x_i) = \log \frac{p(x_i = 1)}{p(x_i = 0)},$$

wherein $p(x_i=1)$ is the probability that the bit $x_i$ is equal to the logical value of 1 and $p(x_i=0)$ is the probability that the bit $x_i$ is equal to the logical value of −1. Thus, the sign of the LLR directly indicates the logical value of the bit $x_i$ and the absolute value of the LLR indicates the certainty of the decision. When working with LLRs at a receiving apparatus, the reconstructed data bit may be reconstructed from a data bit pair (data bit and its repetition)—for example—by simply adding the LLRs of the data bits of the data bit pair, and the logical value of the reconstructed data bit may be decided based on the sign of the sum of the LLRs.

Figure 23:
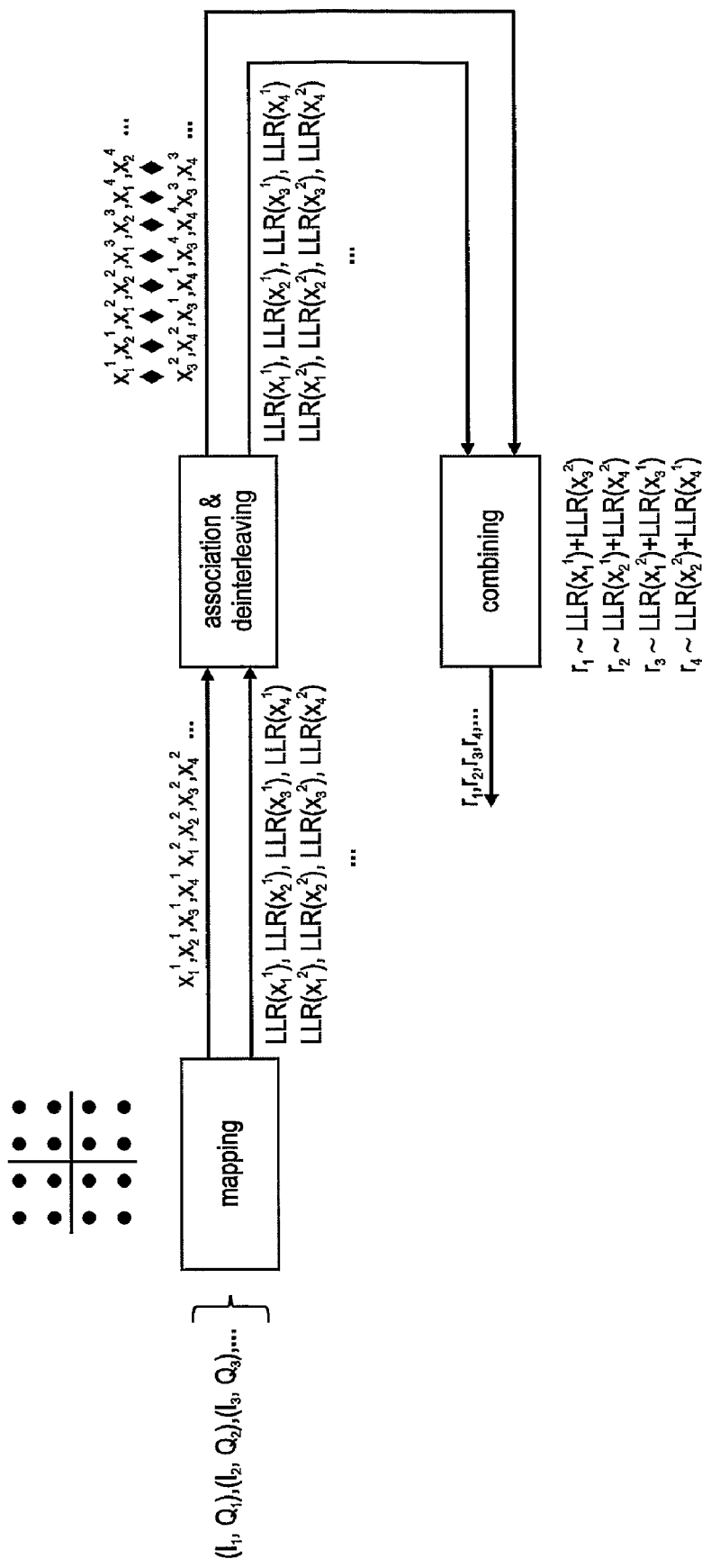
FIG. 23 shows an exemplary demodulation and data stream reconstruction process according to an embodiment of the invention.

FIG. 23 illustrates the reconstruction of the data bit stream $r_1, r_2, r_3, r_4, \ldots$ from the received signal represented by its inphase and quadrature components $I_i$ and $Q_i$ measured for the symbol $(I_i, Q_i)$. Each of the symbols $(I_i, Q_i)$ is mapped to a quadruple of bits $x_1^i, x_2^i x_3^i, x_4^i$ using a 16-QAM constellation indicating the corresponding quadruple of bits for each symbol $(I_i, Q_i)$. Based on the actual values of the symbol components $(I_i, Q_i)$ and the resulting (Euclidian) distance(s) to modulation symbols in the 16-QAM constellation, each of the bits $x_1^i, x_2^i x_3^i, x_4^i$ can be associated with a LLR-LLR $(x_1^i)$, LLR $(x_2^i)$, LLR $(x_3^i)$, LLR $(x_4^i)$—that indicates the certainty of the respective bit being equivalent to the logical value of −1 or 1. Next the bit stream formed by successive quadruples $x_1^i, x_2^i x_3^i, x_4^i$ may be de-interleaved to a data bit stream and an repeated data bit stream and the data bits in the streams belonging together, i.e. the original data bit and its associated repetition, are detected. Next, the reconstructed data bit stream $r_1, r_2, r_3, r_4$ may be built by combining the LLRs of the associated data bits (bit pairs).

When working with hard decisions at the receiving apparatus 2210 the metric may directly indicate the logical value of the respective data bit. Also in this case the combination of data bit pairs for reconstructing the (transmitted) data bit stream may simply add the metrics of the data bits of the bit pair. Also a combination with the use of soft decisions may be possible, i.e. before summing the logical values of the data bits of the data bit pair, same may be weighted using a probability value indicating the certainty in detecting the respective logical value.

In the embodiments of the invention described above, the transmitting apparatus structure has been restricted to the very simple repetition coding scheme as the fundamental FEC (forward error correction) part involved. However it should be apparent to those skilled in the art that other coding schemes may be employed in addition, such as for example convolutional codes, turbo codes, or block codes. Such an encoder could for example be concatenated in a serial fashion before repetition coding on the transmitter side, and the corresponding decoder may be concatenated after the data bit reconstruction means or decoder of the repetition code on the receiving apparatus side. Therefore the embodiments described above should not be understood as to limit the applicability of the present invention to very sophisticated FEC coding schemes like those mentioned above.

Optionally, referring for example to FIG. 6 or FIG. 7, each bit and its interleaved version may be logically inverted either separately after the repetition, or implicitly by inverting the bit prior to its repetition. Additionally the whole signal $s_1(k)$ or $s_2(k)$ may be logically inverted. Accordingly, any inversion in a logical block of the transmitting apparatus structure will need to be reversed in a corresponding logical block in an adapted receiving apparatus structure.

Figure 1:
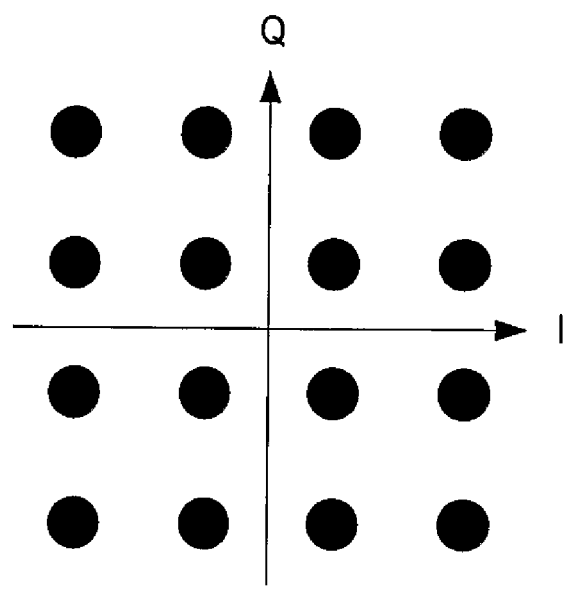
FIGS. 1 and 2 show two examples of 16 QAM in a square constellation.
Figure 2:
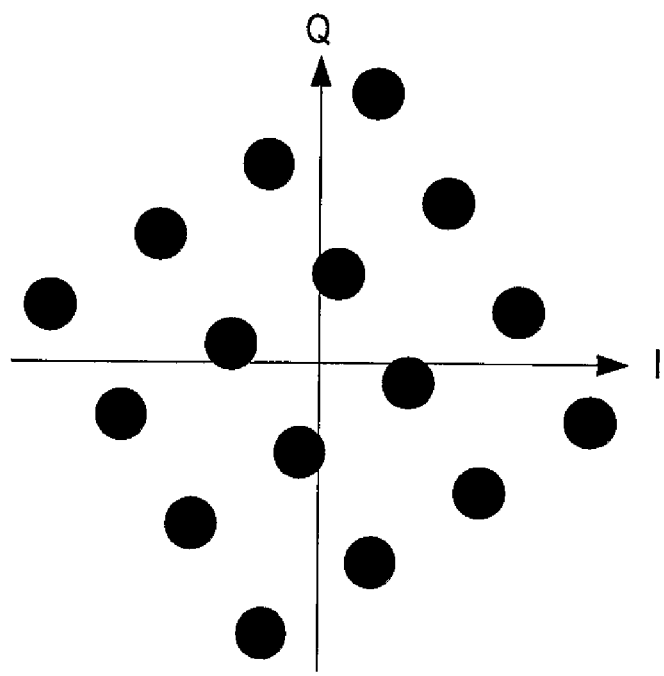

It should be apparent to those skilled in the art that the above description referring to real and imaginary dimensions makes sense only for a case of 16-QAM as in the example of FIG. 1. In a rotated version of the 16-QAM constellation as shown in FIG. 2, these orthogonal dimensions would have to be likewise rotated.

Figure 4:
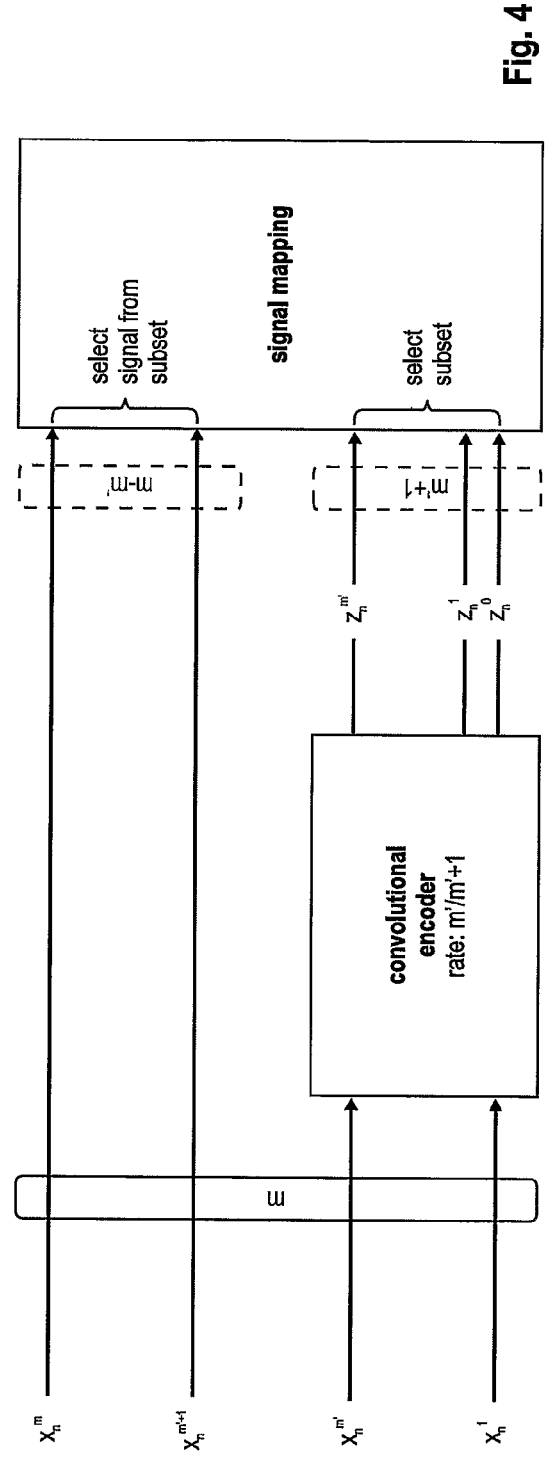
FIG. 4 shows a structure of a prior-art encoder/modulator for TCM.

The following differences of the concept of the invention in comparison to TCM system as shown in FIG. 4 may be noted:
  TCM encodes a part of the original m bits using a convolutional, i.e. a non-trivial, encoder; the present invention simply repeats each of the original m bits, i.e. allows for a simpler implementation of the coder requiring less computational complexity
  The coding rate of the convolutional encoder is restricted t $$\frac{m'}{m'+1}.$$

Figure 5:
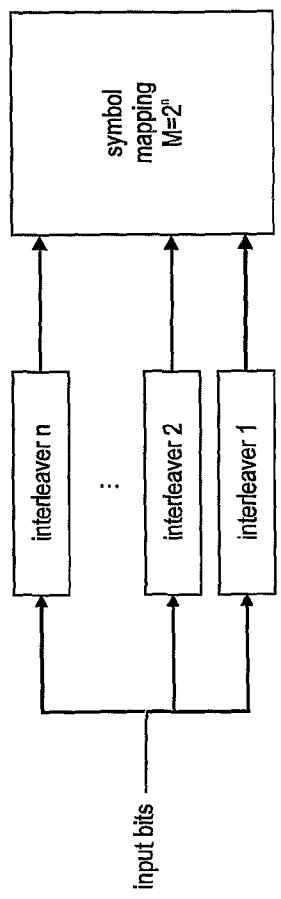
FIG. 5 shows a transmitter block diagram of a prior-art CSED system.

The repetition coder used in the embodiments of the invention may be considered equivalent to a rate ½ code with respect to the original input data stream or may also be interpreted as a rate ²⁄₄ code, since for two input bits four coded bits are obtained
  The set-partitioning approach would result in a 16-QAM mapping that does not fulfil the mentioned properties a), b), c) and d) above Moreover, the present invention differs from a conventional Channel Symbol Expansion Diversity (CSED) for example in its set partitioning scheme. The set partitioning method used by conventional prior-art systems (see for example FIG. 5) refers to a modulation scheme that conforms to the Gray principle for closest neighbours ("Gray mapping"). As can be seen for example in FIG. 9 or 10 the set partitioning method according to the invention uses another mapping concept.

According to the main object, the invention and embodiments of the invention described so far may be employed in any type of communication system. It is to be noted that particularly the characteristics of a mobile entity impose restrictions on the complexity of techniques that can be implemented. When applying the principles of this invention to mobile communication systems it may be possible to implement coders and decoders with low complexity in addition to improving the bit-error rate of the modulation and coding scheme in comparison to QPSK modulated signals.

Another embodiment of the present invention relates to the implementation of the above described various embodiments using hardware and software. It is recognized that the various above mentioned methods as well as the various logical blocks, modules, or circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

What is claimed is:

1. A method for transmitting a data bit stream in a communication system using a 16-QAM (Quadrature Amplitude Modulation) constellation having 16 modulation symbols representable in four rows and four columns in a complex coordinate plane, each modulation symbol of the 16-QAM constellation representable by a combination of four data bits, and the 16-QAM constellation obeying the following mapping rules:
  a first one of the four data bits representing a modulation symbol selects one of two contiguous symbol regions of the 16-QAM constellation based on its logical value, each of the two contiguous symbol regions being formed by two rows adjacent to each other,
  a second one of the four data bits representing the respective modulation symbol selects one of two contiguous symbol regions of the 16-QAM constellation based on its logical value, each of the two contiguous symbol regions being formed by two columns adjacent to each other,
  a third one of the four data bits representing the respective modulation symbol selects one of two non-contiguous symbol regions of the 16-QAM constellation based on its logical value, each of the two non-contiguous symbol regions being formed by two rows not adjacent to each other,
  a fourth one of the four data bits representing the respective modulation symbol selects one of two non-contiguous symbol regions of the 16-QAM constellation based on its logical value, each of the two non-contiguous symbol regions being formed by two columns not adjacent to each other, the method comprising:
  expanding the number of data bits of the data bit stream by repeating the data bits of the data bit stream thereby forming a repeated data bit stream comprising, for each data bit of the data bit stream, a repeated data bit associated to the respective data bit of the data bit stream,
  interleaving at least one of the data bit stream or the repeated data bit stream,
  forming a sequence of data words from the data bit stream and the repeated data bit stream and mapping each data word to a modulation symbol of the 16-QAM constellation,
  wherein each data word has four bits and two bits of the respective data word are formed by data bits of the data bit stream and two bits of the respective data word are formed by data bits of the repeated data bit stream, and
  wherein a data bit of the data bit stream selects a contiguous symbol region and its associated repeated data bit of the repeated data bit stream selects a non-contiguous symbol region, or vice versa,
  modulating the modulation symbols to a carrier frequency, and
  transmitting the modulated symbols.

2. The method according to claim 1, wherein the two data bits from the data bit stream within a data word form the most significant bits of the respective data word and the two data bits from the repeated data bit stream within the respective data word form the least significant bits of the respective data word, or vice versa.

3. The method according to claim 1, wherein the most significant bits of the data word select one of the contiguous symbol regions, respectively, and the least significant bits of a data word select one of the non-contiguous symbol regions, respectively, or vice versa.

4. The method according to claim 1, wherein each of the two bits from the data bit stream selects one of the non-contiguous symbol regions and wherein each of the two bits from the repeated data bit stream selects one of the a contiguous symbol regions.

5. The method according to claim 1, further comprising:
segmenting the data bit stream into a sequence of data bit groups,
wherein the step of expanding the number of data bits of the data bit stream expands the number of data bits by repeating each of the data bit groups,
wherein the repeated data stream is a sequence of repeated data bit groups, and
wherein interleaving is performed per data bit group on a data bit group level.

6. The method according to claim 5, wherein a respective one of the data bit groups and a respective one of the repeated data bit groups consist of two data bits of the data bit stream and two data bits of the repeated data bit stream, respectively.

7. The method according to claim 5, further comprising permuting the data bits of at least one of the data bit groups or the repeated data bit groups prior to forming a sequence of data words.

8. The method according to claim 1, wherein a data bit of the data bit stream and its repeated version in the repeated data bit stream are mapped onto the same modulation symbol.

9. The method according to claim 1, wherein a data bit of the data bit stream and its repeated data bit of the repeated data bit stream are mapped onto different modulation symbols.

10. The method according to claim 1, wherein the complex plane comprises four quadrants, and wherein the mapping rules obeyed by the 16-QAM modulation constellation fulfill the following criteria:
the Hamming distance between modulation symbols within a quadrant having the minimum squared Euclidian distance to each other is one,
the Hamming distance between modulation symbols of adjacent quadrants having the minimum squared Euclidian distance to each other is two and
wherein modulation symbols being antipodal to each other with respect to the origin of the complex coordinate plane have a Hamming distance of four.

11. The method according to claim 10, wherein modulation symbols within a quadrant having an squared Euclidian distance larger than the minimum squared Euclidian distance or equal to the square root of two times the minimum squared Euclidian distance to each other within the quadrant have a Hamming distance of two.

12. The method according to claim 10, wherein the Hamming distance between modulation symbols having an squared Euclidian distance larger than the minimum squared Euclidian distance or equal to the square root of two times the minimum squared Euclidian distance to each other of and being located in adjacent quadrants is three.

13. The method according to claim 1, further comprising encoding the data bit stream prior to expanding the number of bits using a forward error correction encoder.

14. An apparatus for transmitting a data bit stream via a radio channel of a communication system using a 16-QAM (Quadrature Amplitude Modulation) constellation having 16 modulation symbols representable in four rows and four columns in a complex coordinate plane, each modulation symbol of the 16-QAM constellation representable by a combination of four data bits, and the 16-QAM constellation obeying the following mapping rules:
a first one of the four data bits representing a modulation symbol selects one of two contiguous symbol regions of the 16-QAM constellation based on its logical value, each of the two contiguous symbol regions being formed by two rows adjacent to each other,
a second one of the four data bits representing the respective modulation symbol selects one of two contiguous symbol regions of the 16-QAM constellation based on its logical value, each of the two contiguous symbol regions being formed by two columns adjacent to each other,
a third one of the four data bits representing the respective modulation symbol selects one of two non-contiguous symbol regions of the 16-QAM constellation based on its logical value, each of the two non-contiguous symbol regions being formed by two rows not adjacent to each other,
a fourth one of the four data bits representing the respective modulation symbol selects one of two non-contiguous symbol regions of the 16-QAM constellation based on its logical value, each of the two non-contiguous symbol regions being formed by two columns not adjacent to each other,
the transmitting apparatus comprising:
a signal space expansion unit operable to expand the number of data bits of the data bit stream by repeating the data bits of the data bit stream thereby forming a repeated data bit stream comprising, for each data bit of the data bit stream, a repeated data bit associated to the respective data bit of the data bit stream,
an interleaver operable to interleave at least one of the data bit stream or the repeated data bit stream,
a processing unit operable to form a sequence of data words from the data bit stream and the repeated data bit stream and for for mapping each data word to a modulation symbol of the 16-QAM constellation,
wherein each data word has four bits and two bits of the respective data word are formed by data bits of the data bit stream and two bits of the respective data word are formed by data bits of the repeated data bit stream, and
wherein a data bit of the data bit stream selects a contiguous symbol region and its associated repeated data bit of the repeated data bit stream selects a non-contiguous symbol region, or vice versa,
a modulator operable to modulate the modulation symbols to a carrier frequency and
a transmitter operable to transmit the modulated symbols.

15. A computer readable medium storing instruction that, when executed by a processor of a transmitting apparatus, cause the transmitting apparatus to transmit a data bit stream via a radio channel of a communication system using a 16-QAM (Quadrature Amplitude Modulation) constellation having 16 modulation symbols representable in four rows and four columns in a complex coordinate plane, each modulation symbol of the 16-QAM constellation representable by a combination of four data bits, and the 16-QAM constellation obeying the following mapping rules:
a first one of the four data bits representing a modulation symbol selects one of two contiguous symbol regions of the 16-QAM constellation based on its logical value, each of the two contiguous symbol regions being formed by two rows adjacent to each other,
a second one of the four data bits representing the respective modulation symbol selects one of two contiguous symbol regions of the 16-QAM constellation based on its logical value, each of the two contiguous symbol regions being formed by two columns adjacent to each other,
a third one of the four data bits representing the respective modulation symbol selects one of two non-contiguous symbol regions of the 16-QAM constellation based on its logical value, each of the two non-contiguous symbol regions being formed by two rows not adjacent to each other, a fourth one of the four data bits representing the respective modulation symbol selects one of two non-contiguous symbol regions of the 16-QAM constellation based on its logical value, each of the two non-contiguous symbol regions being formed by two columns not adjacent to each other, by:

expanding the number of data bits of the data bit stream by repeating the data bits of the data bit stream thereby forming a repeated data bit stream comprising, for each data bit of the data bit stream, a repeated data bit associated to the respective data bit of the data bit stream, interleaving at least one of the data bit stream or the repeated data bit stream, forming a sequence of data words from the data bit stream and the repeated data bit stream and mapping each data word to a modulation symbol of the 16-QAM constellation, wherein each data word has four bits and two bits of the respective data word are formed by data bits of the data bit stream and two bits of the respective data word are formed by data bits of the repeated data bit stream, and wherein a data bit of the data bit stream selects a contiguous symbol region and its associated repeated data bit of the repeated data bit stream selects a non-contiguous symbol region, or vice versa, modulating the modulation symbols to a carrier frequency and transmitting the modulated symbols.

* * * * *